Figure 1:
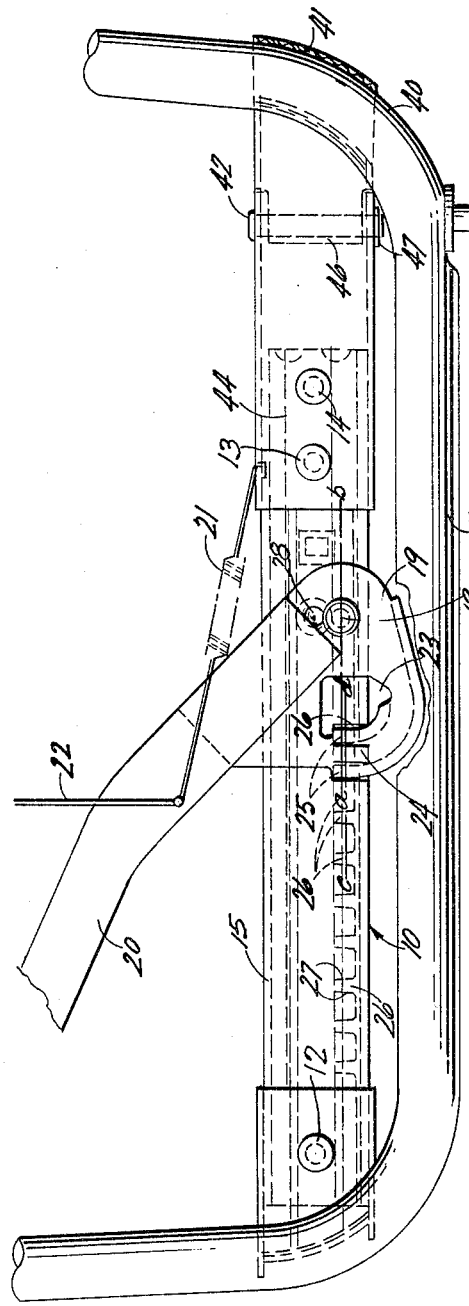

Nov. 29, 1966  H. KRAUSE  3,288,422

HEAVY DUTY SEAT ADJUSTER

Filed July 6, 1965  2 Sheets-Sheet 1

INVENTOR
HERBERT KRAUSE
ATTORNEY

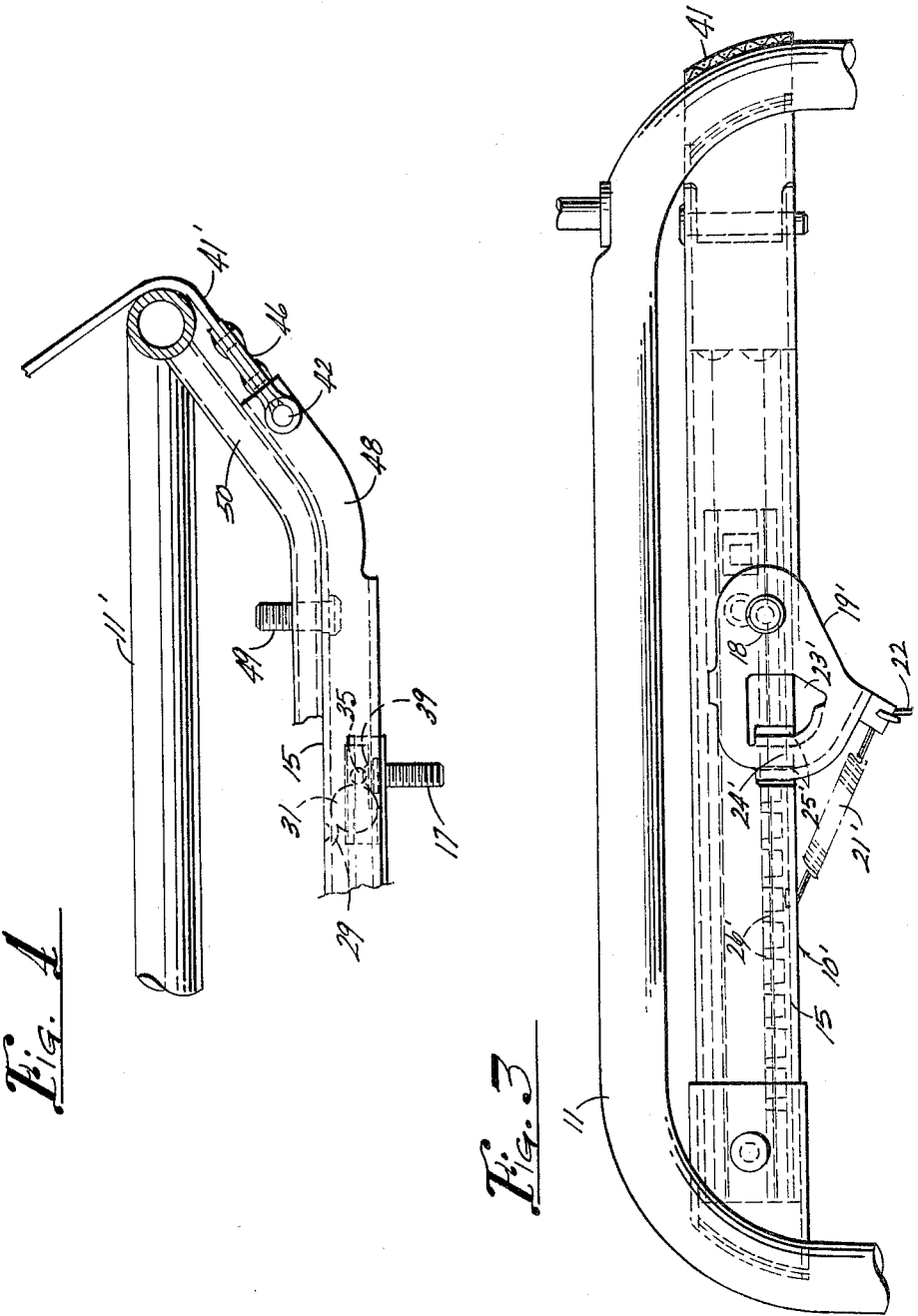

United States Patent Office 3,288,422
Patented Nov. 29, 1966

3,288,422
HEAVY DUTY SEAT ADJUSTER
Herbert Krause, Rockford, Ill., assignor to Atwood Vacuum Machine Company, Rockford, Ill., a corporation of Illinois
Filed July 6, 1965, Ser. No. 469,503
9 Claims. (Cl. 248—429)

This invention relates to a heavy duty seat adjuster for motor vehicles and is more particularly concerned with improvements on the construction of my copending application, Serial No. 359,380, filed April 13, 1964, the present construction being especially designed with a view to permitting fastening of the seat belts to the upper slide under the seat, whereby to avoid the objections going with anchoring of the seat belts to the floor behind the seat, that arrangement having presented a problem as to foot room for rear seat passengers, besides necessitating appreciable change in the seat belt adjustment whenever the seat required any forward or rearward adjustment from a given setting. On the other hand, when the seat belts are anchored to the seat slides, there is the necessity for making the slide structure much heavier to assume the crash loading in the event of a collision, because the upper slide is subject to upward loading with the seat as it pitches forward with the passenger, this reaction being known as "peeling," meaning that the upper slide member fastened to the bottom of the seat tends to peel at its rear end off the lower slide member or track fastened to the floor. The seat adjuster of my invention is designed to stand crash loads.

A salient feature of the seat adjuster of my invention is the provision of a locking lever or latch disposed intermediate the ends of the structure having two substantially parallel spaced teeth provided as integral parts of the side walls of a channel formed integral with the pivoted latch and arranged to engage in correspondingly spaced notches provided in the stationary lower slide member that is fixed to the floor, the latch being purposely pivoted behind these two teeth so that in the event of a crash load, the aforementioned peeling action results in jamming of the two teeth in their notches in the track for a much tighter hold, whereas if the latch were pivoted forwardly of the teeth, in the conventional manner, the peeling action would tend to diminish the holding action and the seat adjuster might give way under crash load. The pivoting of the latch to the rear with respect to the teeth, entirely apart from the jamming action mentioned, in the event of a crash load, is far more dependable also from the standpoint that the latch is placed under tension loading instead of compression loading, and, bearing in mind that the latch is pivoted in a horizontal plane above the teeth, the pull applied under crash loading is far more favorable for a good holding action than a push load, the location of the pivot offset inwardly with respect to the middle of the teeth causing the teeth to have an inward component toward better locking action under a pull load to insure an even better hold.

I prefer to fasten the seat belt to the upper seat slide or to a seat supporting frame below and forwardly with respect to the rounded back portion of the frame, the frame being riveted to the upper seat slide. However, an integral rearward projection may be provided on the rear end of the upper seat slide for anchorage of the seat belt thereto, the belt in that case still being extended over the rounded back top portion of the seat supporting frame that is fastened to the upper seat slide.

Figure 2:
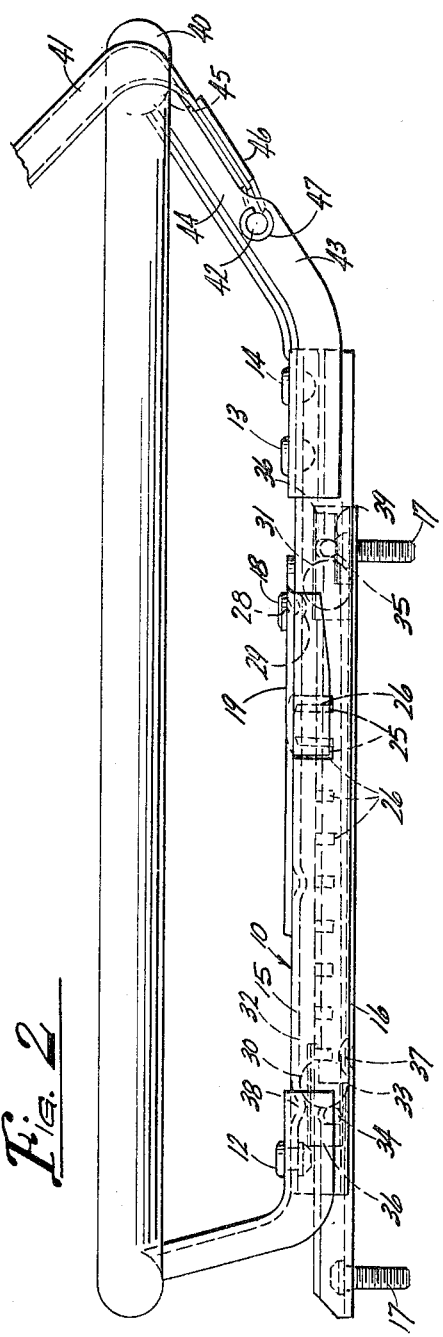

The invention is illustrated in the accompanying drawings, in which:

FIGS. 1 and 2 are a plan view and side view, respectively, of a heavy duty seat adjuster made in accordance with my invention, showing the seat belt fastened to a seat supporting frame that is riveted to the seat slide;

FIG. 3 is a plan view of the right hand assembly, the latch of which is operated by link connection with the latch shown in FIG. 1, and FIG. 4 is a fragmentary side view of a modified or alternative construction in which the seat belt is shown as anchored directly to an integral rearward extension of the upper seat slide but still extends over the rounded rear upper portion of the seat supporting frame that is fastened to the upper seat slide.

Similar reference numerals are applied to corresponding parts throughout the views.

Referring to the drawings, and more particularly to FIGS. 1 to 3, a heavy duty seat adjuster embodying the improvements of my invention is indicated generally by the reference numeral 10 in FIGS. 1 and 2, a similar one being indicated generally by the reference numeral 10' in FIG. 3, two of these structures being provided in connection with each seat, attached to the bottom of the seat by means of a frame 11 riveted at the front end, as indicated at 12, and at the rear end, as indicated at 13 and 14, to the top of the upper seat slide 15, and secured to and supported on the floor on suitable brackets to which the lower slide or track 16 is secured by means of bolts 17. The slides 15 and 16 are in slidable telescoping relation. Both seat slide structures of a pair, of which the left hand one is shown in FIG. 1 and the right hand one in FIG. 3, have latches or locking levers pivoted thereon as indicated at 18, the latch 19 of the left hand seat slide structure including a hand lever 20 on the front end thereof for operating latches 19 and 19' together against the resistance of their return springs 21 and 21', and the two latches being interconnected in the usual way by means of a cross-connecting link 22. The latches 19 and 19' are both stamped from sheet metal and are like the latches disclosed in my aforesaid copending application insofar as they have perforated portions 23 and 23' to enable providing the U-shaped portions 24 and 24', the two legs 25 and 25' of which provide two spaced latch teeth arranged to engage in notches 26 and 26' provided in correspondingly spaced relation in one side of the lower chanel shaped slide or track member 16 of each seat slide structure for double locking engagement with the latches 19 and 19'. However, contrary to what I disclosed in the earlier application, the pivots 18 for the latches 19 and 19' are purposely located in rearwardly spaced relations to the teeth 25 and 25' to insure good holding action under crash loads in the event of a collision, the present arrangement:

(1) Being of advantage, mainly from the standpoint that in the peeling action, referred to before, under crash loading the teeth 25 and 25', instead of tending to be withdrawn from the notches 26 and 26' are jammed down into the notches more firmly for a far better hold, and (2) The reversal in location of the pivots 18, in the event of crash loading, is of advantage from the standpoint that the latches 19 and 19' are subjected to tension loading instead of compression loading, and there is accordingly much less likelihood of there being any tendency for the teeth 25 and 25' to slip sidewise and possibly become disengaged from the notches 26 and 26', whatever lateral component is involved in the crash loading tending actually to force the teeth 25 and 25' inwardly instead of outwardly with respect to the notches 26 and 26', by reason of the location of the pivot 18 on a longitudinal line *ab* (FIG. 1) slightly inwardly with respect to the line *cd* passing through the middle of the teeth 25 and 25'.

Improved holding action is also insured for latches 19 and 19' in three other ways:

(a) Firstly, by having the teeth 25 and 25' spaced the same as the notches 26 and 26' so that there is no notch between the notches engaged in by the teeth 25 and 25', as clearly appears in FIGS. 1 and 3, thereby reducing the likelihood of yield in the notched portion of the track 16 under crash loading;

(b) By tapering the notches 26 and 26' inwardly, as seen at 27 in FIGS. 1 and 3, so that the teeth 25 and 25' not only have easier entry into the notches but there is no need for providing a lot of working clearance to the detriment of the good performance of the seat slide structure from the standpoint of rattle, when the car is in motion, the converging sides 27 of the notches 26 and 26' enabling actual wedging of the teeth 25 and 25' in the notches when fully engaged therein, and (c) To insure full engagement of the teeth in the notches for the wedging engagement referred to, a downwardly embossed circular detent 28 is provided in at least the one latch 19, if not both, arranged to engage in a recess 29 provided therefor in the top wall or web of the slide 15, the detent, being rounded, being adapted to ride out of the recess easily and flex the latch 19 as it rides out of the recess in the unlatching of the seat slide, while the resilience of the sheet metal, of which the latch 19 is made, is enough to insure the snapping down into place of the detent in the recess when the lever 20 has been swung far enough to make the teeth 25 and 25' on the two latches move all the way in when engaging in the notches 26 and 26'.

The anti-friction rolling action afforded by the two cylindrical bearing rollers (or balls) 30 and 31 operating in opposing channels 32 and 33 in the telescoping upper and lower slide members 15 and 16 of the seat slide structure also serves to maintain the members 15 and 16 in a normal spaced relationship in the same way as disclosed in my aforementioned copending application, wherein I also disclose the provision of a pair of smaller bearing balls 34 in front of the front roller 30 and another pair of smaller bearing balls 35 behind the rear roller 31, these additional smaller bearing balls operating in horizontal raceways provided on opposite sides of the channels 32 and 33 between out-turned flanges on the lower slide member 16 and in-turned flanges on the upper slide member 15. These additional balls are maintained in a predetermined longitudinally spaced operating relationship to the rollers by means of thin walled cages or retainers indicated at 36. The retainers also serve to maintain the desired offset relationship of the balls to the rollers so that at the limit of rearward adjustment of the slide 15, when the roller (or ball 30) strikes the stop 37 on the lower slide or track 16 and a similar stop 38 on the upper slide 15, the balls 34, being spaced forwardly at the proper dimension, are forwardly spaced with respect to the foremost one of the notches 26 or 26' so that one of the balls 34 on the slotted side of the lower slide or track 16 cannot drop into the front notch in this extreme position of rearward adjustment of the seat, the novel arrangement affording other advantages also, the principal one being that approximately an inch longer seat travel is thereby made possible, the other advantages being in much better load distribution with consequent reduced wear and easier sliding action. The rear roller (or ball 31) cooperates with a stop defined by the depression 29 previously mentioned and with a stop 39 supplied by the head of the rear bolt 17.

The seat supporting frame 11, as indicated at 40 in FIGS. 1 and 2, provides a nicely rounded broad surface of fairly large radius for engagement of the lower end portion of the seat belt 41, which is fastened, as indicated at 42, to the side walls 43 of a channel-shaped bracket 44 that is welded or otherwise suitably secured to the frame 11 as indicated at 45 and, as previously indicated, this bracket is riveted as at 13 and 14 to the slide 15, a sheet metal clip 46 suitably riveted to the end of the belt 41 providing a bearing in its front end for reception of a pin 42, which, as indicated in FIG. 2, is secured in place by means of a suitable lock washer 47. The provision of the two rivets 13 and 14 in such widely spaced relation shown in FIGS. 1 and 2 is with a view to standing the crash load and keeping the seat firmly anchored to the slide 15 under such loading.

The seat belt may be fastened to an integral extension 48 on the rear end of the slide 15, as shown at 41' in FIG. 4, there being the same clip 46 and pin 42 for fastening the belt to the seat slide extension as was previously mentioned in regard to bracket 44. In this arrangement, the seat supporting frame 11' is arranged to be bolted to the slide 15, as indicated at 49, by means of bracket portions 50 that are welded or otherwise suitably secured to the frame 11'.

It is believed the foregoing description conveys a good understanding of the objects and advantages of my invention. The appended claims have been drawn to cover all legitimate modifications and adaptations.

I claim:

1. In a seat slide structure comprising an elongated stationary horizontal lower slide member, an elongated horizontal seat supporting upper slide member slidably supported on said lower slide member in telescoping relation thereto, and a latch member pivoted on a vertical axis on top of said upper slide member engaging selectively in notches provided in uniformly spaced relation in the top of said lower slide member, the improvement which consists in the provision on said latch member of a plurality of downwardly projecting vertical teeth in spaced parallel relation, the spacing of said teeth corresponding to the spacing of the aforesaid notches, the teeth being engageable in neighboring notches, whereby to distribute the load on said teeth and notches and thereby insure better holding action in the event of any unusual strain tending to cause relative longitudinal movement between said slide members, the vertical pivot for said latch member being on a line parallel to the notches and teeth, the pivot being spaced rearwardly with respect to said teeth so as to be appreciably closer to the rear end of said upper slide member than said teeth, said latch having two downwardly projecting vertical teeth for engagement in neighboring notches, the two teeth being defined by the side walls of an integral channel shaped portion of the latch.

2. A slide structure as set forth in claim 1 wherein the latch is of stamped sheet metal construction and has formed integral therewith and with one end of said teeth and first-mentioned channel two other vertical walls projecting downwardly from said latch defining opposite sides of another integral channel shaped portion of said latch extending in transverse relation to the first-mentioned channel shaped portion in which the notch-engaging teeth are formed.

3. In a seat slide structure comprising an elongated stationary horizontal lower slide member, an elongated horizontal seat supporting upper slide member slidably supported on said lower slide member in telescoping relation thereto, and a latch member pivoted on a vertical axis on top of said upper slide member engaging selectively in notches provided in uniformly spaced relation in the top of said lower slide member, the improvement which consists in the provision on said latch member of a plurality of downwardly projecting vertical teeth in spaced parallel relation, the spacing of said teeth corresponding to the spacing of the aforesaid notches, the teeth being engageable in neighboring notches, whereby to distribute the load on said teeth and notches and thereby insure better holding action in the event of any unusual strain tending to cause relative longitudinal movement between said slide members, the vertical pivot for said latch member being on a line parallel to the notches and teeth, the pivot being spaced rearwardly with respect to said teeth so as to be appreciably closer to the rear end of said upper slide member than said teeth, the notches in the lower slide member being wider at their outer end than at their inner end, whereby to provide ample operating clearance for easy entry of the teeth in said notches, the notches being of approximately the same width at their inner end as the teeth, the latch having a rounded detent projection projecting downwardly therefrom and arranged to engage in a rounded depression provided therefor in the top of the upper slide member, the depression being so located in relation to said detent projection as to lock the latch releasably in its locked position with the teeth fully engaged in the notches, the latch being of resilient sheet metal construction and adapted to be sprung upwardly away relative to its pivot from the upper slide member in the releasing of the latch and to snap down into the recess when the latch is returned to locking position.

4. In a seat slide structure comprising an elongated stationary horizontal lower slide member, an elongated horizontal seat supporting upper slide member slidably supported on said lower slide member in telescoping relation thereto, and a latch member pivoted on a vertical axis on top of said upper slide member engaging selectively in notches provided in uniformly spaced relation in the top of said lower slide member, the improvement which consists in the provision on said latch member of a plurality of downwardly projecting vertical teeth in spaced parallel relation, the spacing of said teeth corresponding to the spacing of the aforesaid notches, the teeth being engageable in neighboring notches, whereby to distribute the load on said teeth and notches and thereby insure better holding action in the event of any unusual strain tending to cause relative longitudinal movement between said slide members, the vertical pivot for said latch member being on a line parallel to the notches and teeth, the pivot being spaced rearwardly with respect to said teeth so as to be appreciably closer to the rear end of said upper slide member than said teeth, the notches in the lower slide member being wider at their outer end than at their inner end, whereby to provide ample operating clearance for easy entry of the teeth in said notches, the teeth being arranged to have wedging engagement in the inner ends of said notches, the latch having a rounded detent projection projecting downwardly therefrom and arranged to engage in a rounded depression provided therefor in the top of the upper slide member, the depression being so located in relation to said detent projection as to lock the latch releasably in its locked position with the teeth fully engaged in the notches, the latch being of resilient sheet metal construction and adapted to be sprung upwardly away relative to its pivot from the upper slide member in the releasing of the latch and to snap down into the recess when the latch is returned to locking position.

5. In a seat slide structure comprising an elongated stationary horizontal lower slide member, an elongated horizontal seat supporting upper slide member slidably supported on said lower slide member in telescoping relation thereto, and a latch member pivoted on a vertical axis on top of said upper slide member engaging selectively in notches provided in uniformly spaced relation in the top of said lower slide member, the improvement which consists in the provision on said latch member of a plurality of downwardly projecting vertical teeth in spaced parallel relation, the spacing of said teeth corresponding to the spacing of the aforesaid notches, the teeth being engageable in neighboring notches, whereby to distribute the load on said teeth and notches and thereby insure better holding action in the event of any unusual strain tending to cause relative longitudinal movement between said slide members, the vertical pivot for said latch member being on a line parallel to the notches and teeth, the pivot being spaced rearwardly with respect to said teeth so as to be appreciably closer to the rear end of said upper slide member than said teeth, the notches in the lower slide member being wider at their outer end than at their inner end, whereby to provide ample operating clearance for easy entry of the teeth in said notches, the notches being of approximately the same width at their inner end as the teeth, the pivot axis for said latch being so located in inwardly spaced relation to the middle portion of said teeth said that the teeth under crash load are forced inwardly farther into said notches with a slight pivotal movement of said latch induced by crash loading.

6. In a seat slide structure comprising an elongated stationary horizontal lower slide member, an elongated horizontal seat supporting upper slide member slidably supported on said lower slide member in telescoping relation thereto, and a latch member pivoted on a vertical axis on top of said upper slide member engaging selectively in notches provided in uniformly spaced relation in the top of said lower slide member, the improvement which consists in the provision on said latch member of a plurality of downwardly projecting vertical teeth in spaced parallel relation, the spacing of said teeth corresponding to the spacing of the aforesaid notches, the teeth being engageable in neighboring notches, whereby to distribute the load on said teeth and notches and thereby insure better holding action in the event of any unusual strain tending to cause relative longitudinal movement between said slide members, the vertical pivot for said latch member being on a line parallel ot the notches and teeth, the pivot being spaced rearwardly with respect to said teeth so as to be appreciably closer to the rear end of said upper slide member than said teeth, the notches in the lower slide member being wider at their outer end than at their inner end, whereby to provide ample operating clearance for easy entry of the teeth in said notches, the teeth being arranged to have wedging engagement in the inner ends of said notches, the pivot axis for said latch being so located in inwardly spaced relation to the middle portion of said teeth that the teeth under crash load are forced inwardly farther into said notches with a slight pivotal movement of said latch induced by crash loading.

7. In a seat slide structure comprising an elongated stationary horizontal lower slide member, an elongated horizontal seat supporting upper slide member slidably supported on said lower slide member in telescoping relation thereto, latch means on the upper slide member engageable selectively in notches provided in spaced relation in the lower slide member, and a safety seat belt fixed at its one end to the rear portion of the upper slide member and extending rearwardly and upwardly therefrom for application to a passenger on the seat carried on said seat slide structure, the improvement which consists in a seat supporting frame fixed to and disposed over the upper slide member and adapted to support a seat thereon, the same having a horizontal rounded back portion of appreciable radius in upwardly and rearwardly spaced relation to the rear end of said upper slide member against the back of which said belt bears for support between the upper slide member and the seat.

8. In a seat slide structure comprising an elongated stationary horizontal lower slide member, an elongated horizontal seat supporting upper slide member slidably supported on said lower slide member in telescoping relation thereto, latch means on the upper slide member engageable selectively in notches provided in spaced relation in the lower slide member, and a safety seat belt fixed at its one end to the rear portion of the upper slide member and extending rearwardly and upwardly therefrom for application to a passenger on the seat carried on said seat slide structure, the improvement which consists in an integral rearward extension on said upper slide member providing spaced parallel vertical side walls between which a horizontal crosspin extends and has the end of the belt secured thereto.

9. In a seat slide structure comprising an elongated stationary horizontal lower slide member, an elongated horizontal seat supporting upper slide member slidably supported on said lower slide member in telescoping relation thereto, latch means on the upper slide member engageable selectively in notches provided in spaced relation in the lower slide member, and a safety seat belt fixed at its one end to the rear portion of the upper slide member and extending rearwardly and upwardly therefrom for application to a passenger on the seat carried on said seat slide structure, the improvement which consists in a bracket secured to and extending upwardly from the rear end portion of the upper slide member and providing spaced parallel vertical side walls between which a horizontal cross-pin extends and has the end of the belt secured thereto, the bracket being secured to and supporting a seat supporting frame in a fixed vertically spaced relation to said upper slide member and adapted to support a seat thereon, the same having a horizontal rounded back portion of appreciable radius in upwardly and rearwardly spaced relation to the rear end of said upper slide member against the back of which said belt bears for support between the upper slide member and the seat.

References Cited by the Examiner
UNITED STATES PATENTS

| | | | |
|---|---|---|---|
| 2,679,889 | 6/1954 | Barden et al. | 308—3.8 |
| 3,076,629 | 2/1963 | Henry-Biabaud | 248—424 |
| 3,186,760 | 6/1965 | Lohr et al. | 297—385 X |
| 3,204,916 | 9/1965 | Pickles | 248—429 |
| 3,207,554 | 9/1965 | Dall | 297—385 |

CLAUDE A. LE ROY, *Primary Examiner.*

R. P. SEITTER, *Assistant Examiner.*